Jan. 28, 1969   R. W. KIZER ET AL   3,424,508
MOUNTING MEANS FOR HIGH SPEED BEARINGS
Filed Aug. 30, 1966
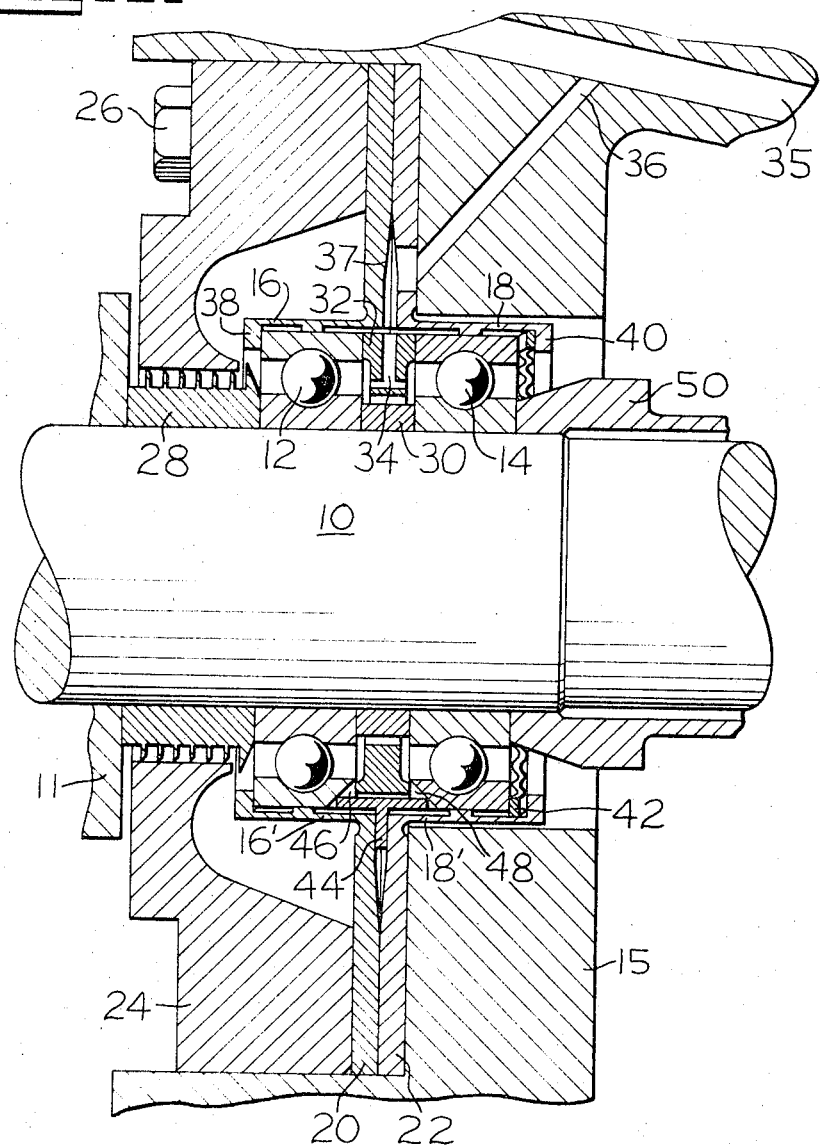
Fig.-1-
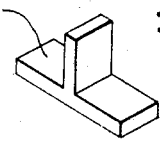
Fig.-2-
INVENTORS
RICHARD W. KIZER
KENNETH D. PROBERT
BY
Fryer, Gunnold, Fix & Phillips
ATTORNEYS

3,424,508
MOUNTING MEANS FOR HIGH SPEED BEARINGS

Richard W. Kizer, Morton, and Kenneth D. Probert, Peoria, Ill., assignors to Caterpillar Tractor Co., Peoria, Ill., a corporation of California
Filed Aug. 30, 1966, Ser. No. 576,001
U.S. Cl. 308—184
Int. Cl. F16c 27/00

4 Claims

ABSTRACT OF THE DISCLOSURE

Improved support means for the outer races of bearing assemblies on a shaft which is subject to vibration in certain speed ranges includes resilient mounting arrangements and provides space for lubricant to dampen excessive vibrations in such speed ranges.

---

In high speed shafts, such as are used for example in gas turbine engines, it is frequently found that one or more critical frequencies of the shaft and mounting system fall within the operating speed range of the engine. A typical case is that of an engine designed to operate at approximately 29,000 r.p.m. in which vibrations destructive to shaft bearings occur between 20,000 and 21,000 r.p.m. Production of a sufficiently fine degree of system dynamic balance to prevent such critical frequencies from resulting in destructive vibratory forces is very costly. However, it has been found that resilient bearing mounting means allows such a shaft system to rotate more nearly about its center of mass (as opposed to its geometric center) and so to reduce the forces on the bearings to an acceptably low level.

It is to resilient bearing mounting means for cases like that described above that the present invention is directed and it is the object of the invention to provide a low cost durable mount in which it is not necessary to adhere to high tolerances and in which the bearing parts supported are resiliently held but firmly held against undesired movement.

Further and more specific objects and advantages of the invention are made apparent in the following specification wherein reference is made to the accompanying drawing.

In the drawing:

FIG. 1 is a sectional view through a bearing assembly which includes mounting means constructed in accordance with the present invention; and FIG. 2 is a perspective view of one of the elements shown in FIG. 1.

Referring first to FIG. 1 of the drawing, a shaft 10, which may be the main shaft of a gas turbine engine, supports a compressor wheel, a part of which is shown at 11. Conventional ball bearings shown at 12 and 14 embrace the shaft and support it concentrically with respect to an opening in a bearing frame or wall 15. The inner races of the bearings 12 and 14 are fitted on the shaft 10 as shown and the outer races are supported by substantially identical annular bearing mounts comprising sleeve-like parts 16 and 18 and integrally formed radial flanges 20 and 22. The flanges 20 and 22 are secured between the wall 15 and an annular clamping member 24 drawn toward the wall and into clamping engagement with the flanges by a circle of cap screws, one of which is shown at 26. The member 24 has a central opening through which the shaft 10 passes and a conventional labyrinth seal element 28 prevents escape of oil from the bearing area through this opening.

A spacer 30 embraces the shaft and is disposed between the inner races of the bearings and a combined spacer and lubricating ring 32 is disposed between the outer races of the bearings. The ring 32 is provided with a T-shaped passage 34 which communicates oil to the bearings from a suitable source through passages 35 and 36 and a space 37 between the inner portion of the radially extending flanges 20 and 22. The sleeve-like portions 16 and 18 of the bearing mounts have flanges 38 and 40 and some space is left between the flange 40 and the bearing 14 for a wave washer 42 which permits snug assembly without the necessity of holding the parts to very high tolerances.

To prevent rotation or creeping of the outer bearing races with respect to the mounting means, a T-shaped key shown at 44 and also shown in perspective in FIG. 2 is employed. The stem of the T is inserted and clamped between the radial flanges 20 and 22 of the resilient mounting members and the cross bar of the T has its opposite ends engaging in notches 46 and 48 formed in the outer bearing races. This part also extends through a notch in the lubricating ring 32 so that this ring and the outer races are all held against relative rotation. The bearing mounts and particularly sleeve portions 16' and 18' are sufficiently resilient to flex upon vibratory motion of the shaft and to appreciably reduce bearing loads. The oil lubricating the bearings also fills the annular cavity between the bearing outer races and the sleeve portions 16' and 18' and serves to dampen the motion of the shaft system.

While the outer races of the bearings are held against axial movement by the flanges 38 and 40 and the wave spring 42 as described above, the inner races and spacer 30 are held against such movement on the shaft by their assembly between the labyrinth seal 28 and a spacer 50 extending between one inner race and another bearing on the shaft which is not shown.

We claim:

1. A resilient mounting for shaft bearings of the kind which have inner races embracing a shaft and corresponding outer races forming pairs of inner and outer races, said outer races being disposed adjacent a wall through which the shaft passes, which mounting comprises two resilient annular elements each embracing an outer race inwardly extending flanges on said elements disposed at opposite ends of the two outer races, radially extending flanges in face to face contact integral with the respective adjacent ends of said elements and means clamping said last named flanges to a wall, detachable spacing means located solely within the annular elements and between said races, said spacing means including oil passages for the introduction of oil to the bearings between the inner and outer races.

2. A resilient mounting of claim 1 in which parts of said annular elements are spaced from the outer surface of the outer races, and means to communicate oil under pressure to the spaces for dampening vibrations of the shaft.

3. A resilient mounting of claim 1 including means interengaging the outer bearing races and the spacing means to prevent relative rotation thereof.

4. A resilient mounting of claim 3 in which said interengaging means includes a part clamped between said radially extending flanges.

References Cited
UNITED STATES PATENTS
2,160,220 5/1939 Leister _____ 308—184
2,826,464 3/1958 Hawk et al. _____ 308—184
3,011,840 12/1961 Littleford _____ 308—184

FOREIGN PATENTS
180,175 8/1958 Pakistan.
483,148 5/1952 Canada.
344,876 4/1960 Switzerland.

EDGAR W. GEOGHEGAN, *Primary Examiner.*

FRANK SUSKO, *Assistant Examiner.*